United States Patent [19]
Shoucri et al.

[11] Patent Number: 5,999,122
[45] Date of Patent: Dec. 7, 1999

[54] MILLIMETER WAVE INSTANT PHOTOGRAPHIC CAMERA

[75] Inventors: Merit M. Shoucri, Manhattan Beach; Steven W. Fornaca; Mikio L. Yujiri, both of Torrance, all of Calif.

[73] Assignee: TRW Inc., Redondo Beach, Calif.

[21] Appl. No.: 09/103,354

[22] Filed: Jun. 23, 1998

[51] Int. Cl.$^6$ .................................................. G01S 3/02
[52] U.S. Cl. .................. 342/351; 250/332; 250/336.1
[58] Field of Search .................................. 342/351, 179; 250/332, 336.1

[56] References Cited

U.S. PATENT DOCUMENTS

| | | |
|---|---|---|
| 4,910,523 | 3/1990 | Huguenin et al. . |
| 4,940,986 | 7/1990 | Huguenin . |
| 5,047,783 | 9/1991 | Hugenin . |
| 5,072,226 | 12/1991 | Chang et al. .............................. 342/351 |
| 5,073,782 | 12/1991 | Huguenin et al. ....................... 342/179 |
| 5,202,692 | 4/1993 | Huguenin et al. . |
| 5,365,237 | 11/1994 | Johnson et al. .......................... 342/179 |
| 5,438,336 | 8/1995 | Lee et al. . |
| 5,530,247 | 6/1996 | McIver et al. . |
| 5,852,419 | 12/1998 | Yujiri et al. .............................. 342/351 |

*Primary Examiner*—Mark Hellner
*Attorney, Agent, or Firm*—Michael S. Yatsko

[57] ABSTRACT

A photographic camera (10) that generates still photographs or images of a scene by detecting millimeter-wave radiation (16). The camera (10) includes an imaging lens (14) that collects the millimeter-wave radiation (16) and focuses the radiation on a plurality of receiver modules (32) positioned in the focal point of the lens (14) where each receiver module (32) includes a plurality of direct detection millimeter-wave receivers (36). In one embodiment, the plurality of receiver modules (32) are mounted on a single sensor card (28), where the receiver modules (32) on the card (28) are aligned in one direction. Each receiver (36) includes detector circuitry that detects the radiation of a pixel in the scene. Electrical signals from the receiver modules (32) are sent to a processing unit (38) on the sensor card (28). In one embodiment, the radiation (16) collected by the lens (14) is directed to a scanning mirror (18) that scans across the scene at a predetermined rate to generate the entire image. Alternately, the sensor card (28) can be moved relative to the mirror (18) to provide scanning of the image.

23 Claims, 1 Drawing Sheet

MILLIMETER WAVE INSTANT PHOTOGRAPHIC CAMERA

BACKGROUND OF THE INVENTION

1. Field of the Invention

This invention relates generally to a millimeter-wave imaging device and, more particularly, to a photographic camera that provides photographs of a scene by generating still images from detecting millimeter-wave radiation.

2. Discussion of the Related Art

Imaging systems that generate images of a scene by detecting background millimeter-wave radiation (30–300 GHz) given off by objects in the scene offer significant advantages over other types of imaging systems that provide imaging by detecting visible light, infrared radiation, other electro-optical radiation. These advantages generally relate to the fact that millimeter-wave radiation can penetrate low visibility and obscured atmospheric conditions caused by many factors, such as clouds, fog, haze, rain, dust, smoke, sandstorms, etc., without significant attenuation, as would occur with the other types of radiation mentioned above. More particularly, certain propagation windows in the millimeter-wavelength spectrum, such as W-Band wavelengths at about 89 to 94 GHz, are not significantly attenuated by the oxygen and water vapor in air. Millimeter-wave radiation is also effective in passing through certain hard substances, such as wood and drywall, to provide imaging capabilities through walls. Thus, millimeter-wave imaging systems are desirable for many applications, such as aircraft landing, collision avoidance and detection systems, detection and tracking systems, surveillance systems, etc. Virtually any type of imaging system that can benefit by providing quality images under low visibility conditions could benefit by using millimeter-wave imaging.

Recent millimeter-wave imaging systems also can offer the advantage of direct detection. This advantage has to do with the fact the millimeter-wave receivers can include components that amplify, filter and detect the actual millimeter-wavelength signals. Other types of imaging system receivers, such as heterodyne receivers, generally convert the received radiation from the scene to intermediate frequencies prior to detection. Therefore, direct detection millimeter-wave receivers that detect the millimeter-wave radiation do not suffer from the typical bandwidth and noise constraints resulting from frequency conversion and do not include the components needed for frequency conversion.

Millimeter-wave imaging systems that use a focal plane imaging array to detect the millimeter-wave radiation and image a scene are known in the art. In these types of systems, the individual receivers that make up the array each includes its own millimeter-wave antenna and detector. An array interface multiplexer is provided that multiplexes the electrical signals from each of the receivers to a processing system. A millimeter-wave focal plane imaging array of this type is disclosed in U.S. Pat. No. 5,438,336 issued to Lee et al., titled "Focal plane Imaging Array With Internal Calibration Source." In this patent, an optical lens focuses millimeter-wave radiation collected from a scene onto an array of pixel element receivers positioned in the focal plane of the lens. Each pixel element receiver includes an antenna that receives the millimeter-wave radiation, a low noise amplifier that amplifies the received millimeter-wave signal, a bandpass filter that filters the received signal to only pass millimeter-wave radiation of a predetermined wavelength, and a diode integration detector that detects the millimeter-wave radiation and generates an electrical signal. The signal from each of the diode detectors is then sent to an array interface unit that multiplexes the electrical signals to a central processing unit to be displayed on a suitable display unit. Each pixel element receiver includes a calibration circuit to provide a background reference signal to the detector. Other types of focal plane imaging arrays including separate detecting pixel elements are also known in the art.

All of the known millimeter-wave imaging systems generate video images that include consecutive frames of video data displayed in a series. Such video millimeter-wave imaging systems have a wide range of use for many different applications, as mentioned above and discussed in the prior art. What is not suggested in the art is a millimeter-wave imaging system that generates still images of a scene, such as a photograph produced by a single lens reflex (SLR) camera that images visible light. There exists a need in the art to provide such a still image millimeter-wave photographic camera, which would be far less expensive than an equivalent video camera. It is therefore an object of the present invention to provide such a camera.

SUMMARY OF THE INVENTION

In accordance with the teachings of the present invention, a photographic camera is disclosed that generates still photographs or images of a scene by detecting millimeter-wave radiation. The camera includes an imaging lens that collects the millimeter-wave radiation and focuses it onto a plurality of direct detection millimeter-wave receivers positioned in the focal plane of the lens. In one embodiment, the plurality of receivers are mounted on a single sensor card, where the receivers on the card are aligned in one direction. Each receiver includes detection circuitry that detects the radiation for a pixel in the scene at a certain instant in time. Electrical signals from the receivers are sent to a processing unit on the sensor card to then be displayed or stored in memory. In one embodiment, the radiation collected by the lens is directed onto a scanning mirror that scans across the scene at a predetermined rate to generate the entire image. Alternately, the sensor card can be moved relative to the mirror to provide scanning of the scene.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to a millimeter-wave photographic camera that generates still images or photographs by detecting millimeter-wave radiation is merely exemplary in nature, and is in no way intended to limit the invention or its applications or uses.

Figure 1:
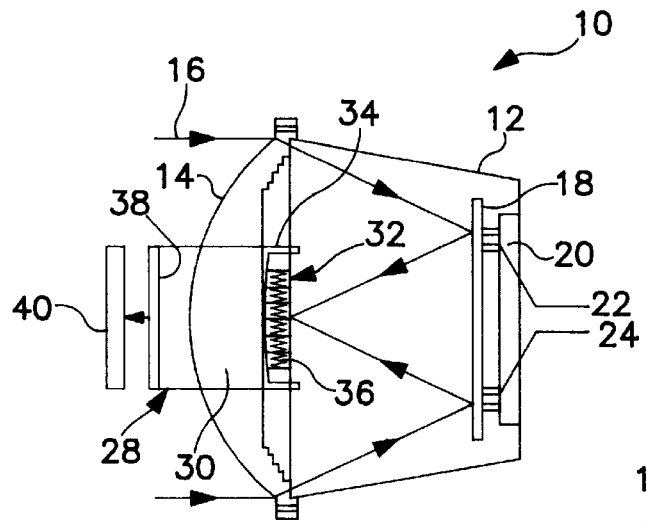
FIG. 1 is a side plan view of a millimeter-wave instant photographic camera according to an embodiment of the present invention.
Figure 2:
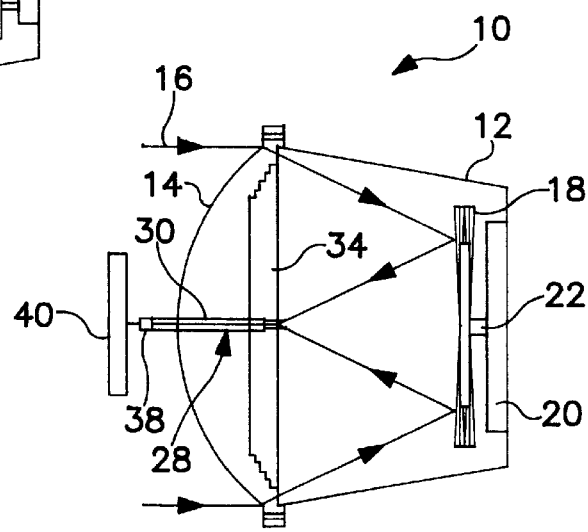
FIG. 2 is a top plan view of the camera shown in FIG. 1.

FIG. 1 shows a side plan view and FIG. 2 shows a top plan view of a millimeter-wave instant photographic camera 10, according to an embodiment of the present invention, that provides a still image or photograph, such as would be provided by a common SLR or digital still camera. One significant difference from the known SLR or digital camera is that the camera 10 includes optics and detectors suitable for imaging a scene by detecting millimeter-wave radiation, as opposed to visible light. The camera 10 includes a housing 12 that encloses the photographic elements of the camera 10. Operation of the camera 10 will be similar to the common still photographic camera in the respect that the user will activate a push button to take a picture of a scene that the camera 10 is directed towards. Thus, specific elements not shown that are required for the operation of the camera 10 would be clear to those skilled in the art.

The camera 10 includes a circular imaging lens 14 that collects background millimeter-wave radiation 16 naturally emitted from the scene being imaged. Typically, the lens 14 would be made of a suitable optical grade plastic. The lens 14 directs the collected millimeter-wave radiation 16 towards a tilting mirror 18. In this embodiment, the mirror 18 is a planar mirror, but other mirror shapes and configurations may be applicable for different applications. The tilting mirror 18 is mounted to a mounting platform 20 by an upper mechanical pivoting device 22 and a lower mechanical pivoting device 24. The combination of the pivoting devices 22 and 24 operate as a mechanical scanner to scan the field-of-view being imaged by the camera 10. The pivoting devices 22 and 24 can be any suitable mechanical device, such as a motor mechanism, that can position the mirror 18 in consecutive scanning positions at a desirable and controllable speed. The pivoting devices 22 and 24 pivot or dither the mirror 18 back and forth to scan a particular field of view of the scene being imaged, as will be discussed in more detail below. Control devices of the camera 10 will cause the mirror 18 to be scanned when the operator activates a camera switch (not shown).

The camera 10 also includes a sensor card 28 defined by a base structure 30, made of a suitable plastic or the like. In one embodiment, the sensor card 28 has a thickness of about 5 mm or less. The sensor card 28 includes a plurality of millimeter-wave monolithic integrated circuit (MMIC) receiver modules 32 that are aligned in a row along the length of a front edge of the base structure 30. The modules 32 are MMIC receiver modules because they use monolithic integrated circuit technology, as would be understood by those skilled in the art. The sensor card 28 is mounted to the housing 12 by mounting pins 34 at a location where the receiver modules 32 are positioned in the focal plane of the lens 14, so that the millimeter-wave radiation 16 is focused onto the receiver modules 32 after being reflected off of the mirror 18.

Each receiver module 32 includes a plurality of separate MMIC pixel element receivers 36 that separately detect a portion of the scene as a single pixel of the image. In one embodiment, the receivers are configured as an MMIC chip that is about 2 mm×7 mm. Each pixel element receiver 36 includes a separate antenna and detecting circuit for direct detection of millimeter-wave radiation. The millimeter-wave detecting circuits detect the radiation and generate an indicative electrical signal. The pixel element receivers 36 can be any suitable millimeter-wave receiver known in the art, such as the receiver elements disclosed in the '336 patent. U.S. Pat. No. 5,530,247 discloses a millimeter-wave imaging system that uses ferroelectric elements to detect millimeter-wave radiation that are also applicable to be used as the receivers 36. In this example, there are six receiver modules 32 on the card 28, where each receiver module 32 includes five separate pixel element receivers 36. Thus, the sensor card 28 generates thirty pixels of the image at any particular instant in time as a one-dimensional focal plane array. Of course, the particular design of the camera 10 can include any practical number of receiver modules 32 on the card 28, including a practical number of pixel element receivers 36. Also, more than one card 28 can be used as hereinafter discussed.

The electrical signals generated by each of the pixel element receivers 36 in all of the receiver modules 32 are sent to a processing system 38 mounted on the base structure 30 of the card 28. The processing system 38 includes all of the necessary processing circuitry, such as signal conditioning electronics, an analog-to-digital converter for converting the analog electrical signals to digital signals, a multiplexing array interface for multiplexing the signals from the receivers 36, and a processing unit for processing the multiplexed digital signals. The electronics required to transfer the electrical data to an image is straight forward, and well known to those skilled in the art. These electronics may include options to enhance the image before displaying it or storing it, in a similar fashion to what is currently being implemented in video and digital cameras. The processed electrical signals can then be displayed on a suitable display device 40, such as a photographic film, a liquid crystal display, etc. Also the digital signals from the processing system 38 can be stored in a memory chip that can then be downloaded onto other media, such as a computer, printer, etc. The images can be stored up to the maximum capacity of the digital memory. The camera 10 can acquire images every second or so, depending on the speed of the pivoting devices 22 and 24.

The pivoting devices 22 and 24 can be any mechanical device suitable for the purposes described herein that is known to those skilled in the art. When the operator desires to take a still picture of a scene, he will activate the camera switch, and the mirror 18 will be pivoted across the field of view. The mirror 18 is shown in various pivot positions in FIG. 2. For each pivot position of the mirror 18, the sensor card 28 generates an image slice of the scene that is combined with the other image slices to generate the full image. A single photograph of the scene is thus produced on a slice-by-slice basis over a certain time period in the embodiment discussed above. The pivoting devices 22 and 24 are calibrated to pivot across a predetermined field of view, for example 20–30 degrees, in a predetermined time period, for example one second or less. The movement caused by the pivoting device 22 and 24 determines the integration time that the receiver modules 32 are imaging a specific pixel in the scene. This time can vary from a millisecond to several seconds, depending on the particular application, the imaged object or scene, and the atmospheric conditions being encountered. In order to achieve good image quality, the required exposure or integration time for the camera 10 can be adjustable. The greater the atmospheric obscurant, the longer the exposure or integration time is required. Therefore, the entire still image of the scene is generated using a single thin sensor card 28 and a pivoting mirror 18 in this embodiment.

There is an incentive to scan in the direction of the wider field-of-view dimension in order to reduce the number of receiver modules 32 required, thus reducing costs. In other words, the receiver modules 32 are aligned in a row, here vertically, and the mirror 18 is scanned in a direction so that each image slice is from top to bottom relative to the orientation of the camera 10. Of course, other designs can alter the position of the receiver modules 32 and the card 28 relative to the scanning direction.

The camera 10 is intended to generally depict the features of the present invention. Variations of the specific design shown can be provided in accordance with the scope of the present invention. For example, although a single sensor card 28 is shown, other designs may include multiple stacked or side-by-side sensor cards, each including a one-dimensional array of receivers, positioned within the focal plane of the lens 14. Of course, the more sensor cards and receiving elements the greater the cost. The camera 10 may have two or three sensor cards with interlaced antenna positioned in order to acquire better image quality. The receiver modules 32 and the sensor card 28 can be aligned either vertically or horizontally. Further, the sensor card 28 can be aligned in any orientation relative to the mirror 18. Additionally, the orientation of the lens 14 relative to the sensor card 28 can be changed in different designs, as long as the receiving modules 32 are positioned in the focal plane of the lens 14. Also, the sensor card 28 can be positioned at the location of the mirror 18, and scanning can be performed in other ways.

Since the separate pixel element receivers 36 in the receiver module 32 have independent responses, there is a need to reference the receivers 36 to a uniform thermal load. This can be achieved by using an on-chip reference load switch, such as the type disclosed in the '336 patent, by having all of the receiver modules 32 look at a uniform load within the camera housing 12 during the time the camera 10 is not in use. The tilting mirror 18 can also serve as a uniform absorptive surface by changing its electromagnetic properties from fully reflective to fully absorptive. This could be done mechanically and electromagnetically using a reflective surface of polarizing wires with mechanically activated dipole surfaces behind it. For different applications, the camera 10 can be either hand-held or positioned on a fixed platform. For applications requiring ranges below 100 feet, the camera 10 can be hand-held or attachable, since the diameter of the lens 14 or antenna elements required to image is no larger than one foot. For applications requiring ranges beyond 100 feet, and up to a few kilometers, a fixed platform is more desirable since the sensor weight and size become larger. For the latter case, it is possible that the camera's focusing antenna be mechanically scanned instead of the card itself to obtain the azimuthal field-of-view.

Figure 3:
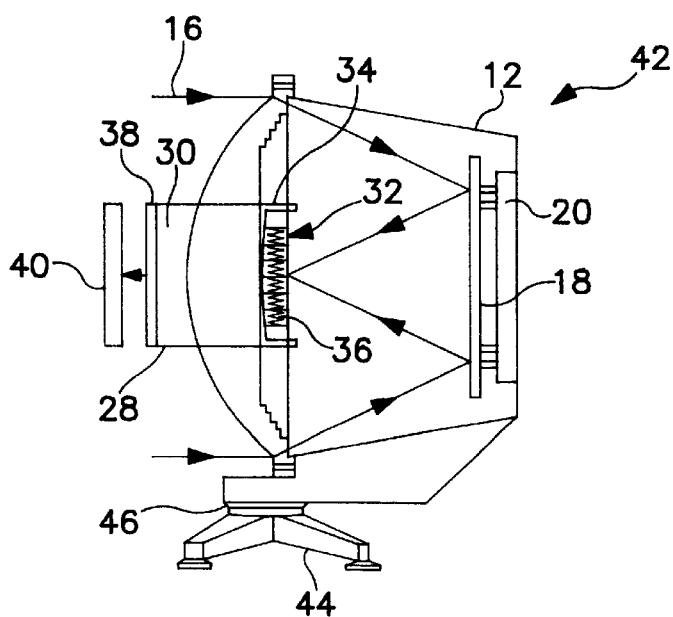
FIG. 3 is a side view of a millimeter-wave instant photographic camera according to another embodiment of the present invention.

The embodiment discussed above is directed to a design where the sensor card 28 is held fixed, and the mirror 18 scans the scene. Alternately, it may be desirable to pan the camera 10 itself much like a panorama film camera. FIG. 3 shows a side view of a millimeter-wave photographic camera 42 that incorporates this design, according to another embodiment of the present invention. Most of the components of the camera 42 are the same as the camera 10, and thus, the like components are identified by the same reference numeral. In this embodiment, the housing 12 is pivotally mounted on a stand 44 by a pivoting element 46. The housing 12 is pivoted on the stand 44 in an automatic and controlled manner when the camera switch is activated such that the sensor card 28 is moved relative to the scene. In this embodiment, the mirror 18 is fixedly mounted to the mirror mount 20. Therefore, the field-of-view is generated by movement of the housing 12.

The foregoing discussion discloses and describes merely exemplary embodiments of the present invention. One skilled in the art will readily recognize from such discussion, and from the accompanying drawings and claims, that various changes, modifications and variations to be made therein without departing from the spirit and scope of the invention as defined in the following claims.

What is claimed is:

1. An imaging system for generating a still image of a scene by detecting millimeter-wave radiation from the scene, said system comprising:
   a housing;
   a lens mounted to the housing and collecting the millimeter-wave radiation from the scene;
   a plurality of receiving elements, each receiving element detecting the millimeter-wave radiation and radiation from a uniform reference source, and generating an electrical signal representative of a pixel of the image, wherein the combination of all of the plurality of receiving elements only detects a portion of a total of the still image of the scene at any given instant in time; and
   a processing system responsive to the electrical signals from the receiving elements, said processing system generating the still image of the scene, said still image being a discrete image that is distinct and separate from any other image.

2. The system according to claim 1 wherein the receiving elements are aligned in a row relative to each other to form a one-dimensional array.

3. The system according to claim 2 wherein the scene is scanned across the length of the row of the plurality of receiving elements.

4. The system according to claim 1 further comprising a mirror mounted to the housing, said lens directing the millimeter-wave radiation onto the mirror and said millimeter-wave radiation being reflected off of the mirror and onto the plurality of receiving elements.

5. The system according to claim 4 wherein the mirror is mounted to the housing by at least one mechanical pivoting device, said at least one mechanical pivoting device pivoting the mirror to scan a field-of-view of the scene onto the plurality of receiving elements to image the scene.

6. The system according to claim 4 wherein the mirror is rigidly mounted to the housing, said camera further including a camera mount, said housing being pivotally mounted to the mount so that when the housing is moved on the stand, the plurality of receiving elements scan the scene.

7. The system according to claim 1 further comprising a display device, said display device displaying the still image of the scene.

8. The system according to claim 1 wherein the plurality of receiving elements and the processing system are all part of a single sensor card.

9. The system according to claim 8 wherein the single sensor card has a width of about 5 mm or less.

10. The system according to claim 8 wherein the plurality of receiving elements are mounted on the sensor card as a one-dimensional focal plane detector array.

11. The system according to claim 1 wherein the plurality of receiving elements are configured as part of a plurality of separate receiving modules mounted on one or more sensor cards.

12. An imaging system for generating a still image of a scene by detecting millimeter-wave radiation from the scene, said system comprising:
   a housing;
   a lens mounted to the housing and collecting millimeter-wave radiation from the scene; and
   at least one sensor card, said at least one sensor card including a focal plane detector array including a plurality of receiving modules where each receiving module includes at least one receiving element that detects millimeter-wave radiation, wherein the receiving modules are aligned in a row relative to each other, each receiving element generating an electrical signal representative of a pixel of the image, wherein the combination of all of the plurality of receiving modules only detects a portion of a total of the still image of the scene at any given instant in time, said at least one sensor card further including a processing system that receives electrical signals from the plurality of receiving modules and generates the still image of the scene, said still image being a discrete image that is distinct and separate from any other image.

13. The system according to claim 12 further comprising a mirror mounted to the housing, said lens directing the millimeter-wave radiation onto the mirror and said millimeter-wave radiation being reflected off of the mirror and focused onto the focal plane detector array.

14. The system according to claim 13 wherein the mirror is mounted to the housing by at least one mechanical pivoting device, said mechanical pivoting device pivoting the mirror to scan a field-of-view of the scene onto the focal plane detector array to image the scene.

15. The system according to claim 12 further comprising a display device, said display device displaying the still image of the scene.

16. The system according to claim 12 wherein the single sensor card has a width of about 5 mm or less.

17. The system according to claim 12 wherein the at least one sensor card is a plurality of sensor cards where each sensor card includes a one-dimensional focal plane detector array including a plurality of receiving modules.

18. A photographic camera for generating a photograph of a scene, said photographic camera including a camera housing, a camera lens, and a plurality of receiving elements, said lens collecting millimeter-wave radiation from the scene and directing it to the plurality of receiving elements, said plurality of receiving elements detecting the millimeter-wave radiation and generating an electrical signal indicative of the received millimeter-wave radiation from the scene, wherein the combination of all of the plurality of receiving elements only detects a portion of a total of the still image of the scene at any given instant in time, said camera further including a processing system receiving the electrical signals from the receiving elements, and generating the photograph of the scene from the electrical signals, said still image being a discrete image that is distinct and separate from any other image.

19. The camera according to claim 18 wherein the plurality of receiving elements are configured on a plurality of receiving modules that define a focal plane detector array mounted on a sensor card.

20. The camera according to claim 19 further comprising a scanning device that causes the millimeter-wave radiation received from the scene to be scanned across the focal plane detector array to generate the image.

21. A method of generating a still image of a scene by detecting a millimeter-wave radiation, said method comprising the steps of:

collecting the millimeter-wave radiation from the scene;

focusing the collected millimeter-wave radiation from the scene onto a plurality of receiving elements, each of the receiving elements detecting the millimeter-wave radiation and generating an electrical signal representative of a pixel of the image, wherein the combination of all of the plurality of receiving elements only detects a portion of a total of the still image of the scene at any given instant in time; and sending the electrical signals to a processing system that processes the electrical signals and generates the still image of the scene, said still image being a discrete image that is distinct and separate from any other image.

22. The method according to claim 21 further comprising the step of directing the collected millimeter-wave radiation to a mirror and using the mirror to scan the scene across the plurality of receiving elements.

23. The method according to claim 21 wherein the step of providing the plurality of receiving elements includes providing the plurality of receiving elements on a single sensor card, where the receiving elements are aligned in a row to form a one-dimensional focal plane array.

* * * * *